United States Patent
Schmidt et al.

(10) Patent No.: US 9,558,414 B1
(45) Date of Patent: Jan. 31, 2017

(54) METHOD FOR CALCULATING A RESPONSE TIME

(71) Applicant: GM GLOBAL TECHNOLOGY OPERATIONS LLC, Detroit, MI (US)

(72) Inventors: Gerald Schmidt, Frankfurt am Main (DE); Thomas Schramm, Mainz (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/811,414

(22) Filed: Jul. 28, 2015

(30) Foreign Application Priority Data

Jul. 28, 2015 (DE) .................. 10 2014 011 264

(51) Int. Cl.
  *G06K 9/00* (2006.01)
  *B60Q 9/00* (2006.01)
  *G05D 1/00* (2006.01)

(52) U.S. Cl.
  CPC ............ *G06K 9/00845* (2013.01); *B60Q 9/00* (2013.01); *G05D 1/0061* (2013.01)

(58) Field of Classification Search
  CPC ...... G06K 9/00845; B60Q 9/00; G05D 1/0061
  USPC .......................................................... 701/23
  See application file for complete search history.

(56) References Cited

U.S. PATENT DOCUMENTS

| 6,226,570 | B1 | 5/2001 | Hahn | |
| 7,321,818 | B2* | 1/2008 | Michi | B60K 31/0008 180/169 |
| 7,617,037 | B2* | 11/2009 | Desens | B60K 31/0008 340/435 |
| 7,640,108 | B2* | 12/2009 | Shimizu | B60K 35/00 180/204 |
| 7,706,954 | B2* | 4/2010 | Michi | B60K 31/0008 180/170 |
| 8,918,250 | B2* | 12/2014 | Hollifield | B60R 1/00 345/173 |
| 9,150,200 | B2* | 10/2015 | Urhahne | B60W 50/16 |
| 9,340,197 | B1* | 5/2016 | Miersch-Wiemers | B60D 1/26 |
| 9,340,204 | B2* | 5/2016 | Schnieders | B60W 30/00 |
| 2014/0125474 | A1 | 5/2014 | Gunaratne | |

FOREIGN PATENT DOCUMENTS

DE  102010022433  A1  12/2011

OTHER PUBLICATIONS

Country Patent Office, Country Search Report for Country Application Number _, date.

* cited by examiner

*Primary Examiner* — McDieunel Marc
*Assistant Examiner* — James E Stroud
(74) *Attorney, Agent, or Firm* — Lorenz & Kopf LLP

(57) ABSTRACT

A method for calculating a response time is described. The response time is required in order to direct the attention of a vehicle's driver at the traffic on the road. The driver is monitored by sensors and a state of attentiveness of the driver is ascertained. The state of attentiveness is used to calculate a value, to which an anticipated response time is assigned. Further a method for operating a motor vehicle, a computer program product and a correspondingly equipped motor vehicle are described.

16 Claims, 1 Drawing Sheet

METHOD FOR CALCULATING A RESPONSE TIME

CROSS-REFERENCE TO RELATED APPLICATION

This application claims priority to German Patent Application No. 102014011264.0, filed Jul. 28, 2014, which is incorporated herein by reference in its entirety.

TECHNICAL FIELD

The present disclosure pertains to a method for calculating a time for drawing the attention of a motor vehicle driver to traffic on the road, also known as a response time, so that the driver may be alerted to traffic situations and can react as necessary.

BACKGROUND

It is known that long drives in a motor car are tiring. Over time a driver's concentration level drops. A decline in concentration may lead to potentially hazardous traffic situations not being recognized or judged correctly. Also traffic situations may be misinterpreted leading to the wrong reaction as regards car control.

Fatigue warning systems are known from the art, which assess the alertness of a driver using a variety of criteria. Among others it is known to detect and electronically evaluate eye, pupil and/or eyelid movements of the driver by means of cameras, and on this basis to draw conclusions as to the driver's state of alertness. A warning can then be emitted in the form of an acoustic signal, a graphical display or vibration of a vehicle interface e.g. the steering wheel.

Furthermore, modern vehicles are frequently equipped with driver assistance systems. Such driver assistance systems may, for example, include an automatic longitudinal speed regulation, frequently called adaptive cruise control, which is capable of automatically maintaining the distance to the preceding motor vehicle. To this end, the assistance system may interact alternately with the accelerator and the brake. Also lane assist systems are frequently installed in current motor vehicles. Lane assistance systems prevent the vehicle from inadvertently leaving the lane by interfering with the steering mechanism. These systems too are contributors to safety.

The afore-mentioned systems ease the burden on the driver, but may contribute to the driver not maintaining his situational awareness of the current traffic conditions on the road.

For some time now work has been going on to develop motor vehicles which are operated completely automatically. Such motor vehicles are intended to drive from a current location of the motor vehicle to a target location without any intervention on the part of the driver, wherein dangerous situations are automatically detected.

It is, however, feasible that for safety reasons in extreme situations, control of the motor vehicle is to be handed over to the driver. It is also feasible that automatic driving could be restricted to certain zones and would not be permitted outside these zones. In urban regions, for example, where the number of road users of all categories is high including motor vehicle drivers, cyclists, pedestrians etc., automatic driving could be prohibited. Then it must be ensured that even with motor vehicles equipped with such automatic systems, drivers must always be in control in such zones.

During times in which the vehicle drives autonomously, the driver of the motor vehicle may occupy himself with other things. For example, a driver might read, listen to music, watch a film or make a telephone call. While such activities are going on, the driver might not pay attention to what is happening on the road. If, however, the driver has to assume control of the motor vehicle, for example when the driver is approaching a self-drive zone or is about to enter a potentially hazardous situation, he or she must be alerted to this fact. Depending on the current activity of the driver, it may take a certain amount of time until he or she has concentrated attention on the traffic and becomes aware of the situation before he or she can take over control of the motor vehicle. Therefore, a warning must be issued in advance in good time.

SUMMARY

In accordance with the present disclosure, a method is provided which issues a message to a driver in good time allowing him to react and take over control of the motor vehicle. The method described herein may be used for calculating a response time. The response time is the time which is required in order to draw the motor vehicle driver's attention to the traffic on the road so that the driver becomes aware of the traffic situation and can react as necessary.

The response time depends on the particular driver, and the driver's state, e.g., wakefulness, as well as his or her current activity. A tired driver who happens to be reading a book, may require longer in becoming aware of the traffic situation and taking over control of the motor vehicle than a wakeful driver who is listening to music while looking at what is going on outside.

In terms of the method described herein the driver is monitored by sensors used to ascertain a state of attentiveness. Having ascertained the driver's state of attentiveness, a value is calculated, to which is then assigned an anticipated response time. Instead of one value, several values can be calculated, to which an anticipated response times is assigned.

A person's state of attentiveness can be estimated utilizing his apparent behavior patterns. Relevant criteria for the state of attentiveness, among others, are color of the face, blinking of the eyes, short habitual glances, for example looking out of a side window, gestures and/or hand movements. As soon as a person becomes tired, these behavior patterns change. As such, additional activities may occur such as rubbing of the face and eyes, scratching, yawning, restless movements on the seat and such like. When a person becomes very tired, eyelid closures periods equal to or greater than 2 seconds become very common in the majority of people. Often this is accompanied by rolling of the eyes in an upward or downward direction. In some people there may be signs of the eyes not coordinating properly. This may become evident when people give the impression of squinting. Tired people as a rule are also paler. A number of other outward signs come to mind, which represent an expression of tiredness such as an attitude of the body.

The driver's activity at the moment response is required, also plays an important role, when calculating the response time. A driver, who during automated driving is deeply buried in a book, usually takes longer to become aware of a traffic situation than a driver who is listening to music while simultaneously watching the traffic.

The attentiveness of the driver can be detected via sensors and conclusions can be drawn according to the described methods as to how long it is expected to take the driver to respond and turn his attention to the traffic on the road.

The response time ascertained with the aid of the described methods may be used for different purposes. On the one hand further measures to be taken by the motor vehicle may be made dependent on the result of the calculation. As such in an extreme situation for example, it may be determined that the response time until a reaction occurs is too long, with the result that emergency braking is initiated. On the other hand, the safest decision can be taken, generally speaking, as long as the driver is no longer able to turn his attention to the traffic on the road in good time.

In a first possible further development provision may be made for the driver to be monitored regularly or continually. In this way it is possible to monitor the anticipated response time, and the change in anticipated response time, in dependence of the driver's state at all times or at regular intervals. Based on the change, a declining state of wakefulness of the driver can for example be detected, and a timely interruption of the drive can be initiated.

According to a development, ascertaining the driver's state of attentiveness can be based on determining the driver's tiredness, the direction which his attention takes (focus of attention) and/or the driver's gestures. Determining the focus of attention means that the driver's optical and/or mental spatial focus is determined. His attention may be directed, for example, at a book lying in his lap, at a control of the motor vehicle or at a passenger. It may also be that the driver continues to keep his eye on the traffic. Depending thereupon the period of time necessary to become aware of the traffic situation may be of varying length, and may be ascertained according to the method described here. A tired driver has to wake up first before he becomes aware of the situation, and this takes a certain amount of time. A period of time for waking up may therefore be added to the response time, e.g. two seconds for a slightly tired driver and five seconds for a very tired driver.

In a further possible development the driver's tiredness may be determined by means of his eyes, the position of his head and/or the angle of his head. Since if the driver himself is in control, there is no need for determining a driver's tiredness via tiny movements of the steering wheel, rather it is more reliable to use the eyes, head position and/or angle of the head for determination. Eye detection may involve, for example, monitoring eye activity and/or lid closure behavior. The position of the head may also be used to draw conclusions as to the driver's tiredness. If the head is lowered, this may be an indication of the driver feeling tired. A head which is resting against the head rest may also be an indication of tiredness. A head held upright on its own on the other hand indicates wakefulness. Also the angle between head and upper body may be an indication for wakefulness or tiredness of the driver. A chin resting on the chest, for example, means the driver is tired. And a head held at an angle to one side also allows the conclusion that the driver is tired.

According to a further development of the method described here the driver's gestures can be observed such as movements of the hands and/or arms. Furthermore an accumulated hand-arm travel may be determined. It was found that an accumulated hand-arm travel can be used for drawing conclusions as to the driver's state of attentiveness and wakefulness.

In a possible development a determination may be made of the direction of view and gestures, in particular an accumulated hand-arm travel, or of a direction of view, tiredness and gestures, in particular an accumulated hand-arm travel, in combination with each other, respectively. This may be used to draw conclusions as to the driver's focus of attention and his activity. A downward look in connection with his hands held low (e.g. hands lying in the lap) may indicate that the driver is reading a book lying in his lap or that he is working with or on, some tool or implement lying in his lap. Responding means that the driver must first stop paying attention to his current activity (terminate his mental and spatial focus of attention), which may last for a certain period of time. Only one lowered hand in conjunction with a downwardly directed look may, for example, mean that he is operating a mobile phone or the like, which would usually be consistent with less deep concentration with regards to the tool or implement. From gestures in combination with the direction of view it can thus be predicted with a certain amount of accuracy how long it will be, until a driver will have recovered his awareness to the current situation.

According to a further possible development of the method provision is made for classifying the state of attentiveness of the driver, wherein each class is assigned a value, wherein when determining several aspects of the driver's attentiveness, a value is determined for each observed aspect. As such a separate value may be determined for the driver's state of the eyes, the position of the head and/or the angle of the head, a separate value may be determined for the direction of attention and/or for the driver's gestures. The driver's behavior detected by the sensors can be classified in each of the respective categories and a value may be specified for each class of each aspect. Due to this respective classification a resulting attentiveness can be ascertained as regards each examined aspect. The values from the respective categories may be compared with each other and contradicting results may be compensated for, as required, so that reliability of the method is increased. In addition certain criteria can be given more weight than others, for example the driver's tiredness may be given more weight than the direction of attention. All these factors together lead to a more realistic estimate of the driver's attentiveness. The response time can thus be more accurately predicted.

In a further development of the method a table may be provided, in which response times are assigned to the values. Such a table may thus have more than two dimensions. Assignment of response times in a table permits a quick determination of the response time with only a small amount of calculation involved. In addition tables may be easily exchanged. Updating them is therefore quite simple.

According to a further development, vehicle aspects may be taken into consideration when assigning the response time. As such the vehicle infrastructure itself may require varying amounts of response times. For example, it may be determined that a driver is currently operating a navigation system which may a considerable impact on the driver's focus of attention because operating a navigation system certainly requires the driver's attention. The operation of other vehicle controls also, for example the multimedia system or the heating, may require the driver's attention.

According to a further development response times may be adapted in a driver-individual manner. As such it is possible to develop the method such that it becomes a self-teaching method and to adapt response times to suit the driver as a function of his concrete reactions. To this end driver detection may be provided.

A first independent subject of the present disclosure relates to a method for operating a motor vehicle. In terms of the method the above-mentioned process is used during operation of the motor vehicle. A motor vehicle operated in this way can permanently calculate a necessary response times. A motor vehicle operated according to the method can be operated safely if a necessary response time of a driver of the vehicle can be taken into consideration in further decision making.

According to a further refinement of the method for operating the motor vehicle provision may be made for the vehicle to drive itself in an automated manner. The automated operation of the motor vehicle allows the driver to pay attention to matters other than the traffic on the road. Nevertheless certain situations may arise which make it necessary or desirable for the driver to intervene. By calculating the response time this can be taken into account of when planning the next steps.

According to a further development of the method a traffic situation may be ascertained which will within a very short moment demand the driver's attention, wherein depending on the result of the method for calculating the response time, a signal will be sent to the driver to take over control of the vehicle. Thus, the driver can be warned within a sufficiently short time in order to grasp the traffic situation facing him and to react accordingly. This increases the operational safety of an automatically driven motor vehicle.

According to a further aspect of the method the request to take control can be adapted both in terms of time and quality to match the driver's state of attentiveness. Thus, for example, suitable signals for the request to take control can be selected and utilized, such as optical and/or acoustic signals. With acoustic signals it is possible to select loudness and type of acoustic signal, for example, speech or a more abstract signal or a warning signal. In addition, it is possible to vary the loudness of an acoustic signal. Optical signals may for example appear in a head-up display, which in addition may give an indication where the danger might possibly be.

A further independent aspect relates to a computer program product with a computer-readable storage medium, which has commands embedded in it, which when executed on the computing unit, cause the suitably adapted computing unit to execute a method of the above-mentioned kind. This method may be the method for calculating the response time or the method for operating a motor vehicle or both.

A further independent aspect relates to a motor vehicle with a sensor array used for monitoring the attentiveness of the vehicle's driver, wherein the motor vehicle includes a storage medium with a previously described computer product. A respective motor vehicle permits, depending on the actual design, to use monitoring for increasing safety in road traffic.

According to a further aspect of the motor vehicle, the motor vehicle may include cameras, stereo cameras, ultrasound sensors and/or infrared sensors for monitoring the driver's attentiveness. The cameras may for example be directed at the driver from the front. A camera may be arranged, for example, in an A-column, in the roof lining or in a bracket of the rear-view mirror. The use of stereo cameras makes it possible to ascertain depth information in order to be able to better estimate a driver's gestures and angle of head. Ultrasound sensors also permit depth resolution of the driver's position. Infrared sensors can be used as another means for gathering positional information on the skin temperature of the driver or his blood circulation, in particular in a dark environment such as in night driving, which means that for example an examination of the driver's blood circulation in the skin would, if reduced, point to increasing tiredness. Sensors may also be used in combination, for example a stereo camera and infrared sensors or two cameras arranged at different positions. Two of these cameras could interact with each other possibly as stereo cameras.

A further independent aspect relates to a device for calculating a response time which is required to direct the attention of a driver of a vehicle to the traffic on the road. Sensors are provided for monitoring the driver, and a computing unit is provided with the aid of which the driver's state of attentiveness is ascertained. The computing unit calculates a value which has an anticipated response time assigned to it. A further development provides for the computing unit to be configured in such a way that monitoring is carried out regularly or continually.

A further aspect provides for means to be provided with which the driver's tiredness, his direction of attention and/or driver gestures can be determined. The means may be cameras, stereo cameras, ultrasound sensors and/or infrared sensors or other suitable sensors for monitoring the driver.

According to a further aspect means may be provided for detecting the eyes, head position and/or angle of head of the driver, which are then used by the computing unit for determining the driver's tiredness.

According to an additional further aspect sensors may be configured for ascertaining hand and/or arm travel or an accumulated hand-arm travel. In a further arrangement information on the driver's direction of view can be combined with the hand-arm travel.

According to an additional aspect the computing unit may be adapted to classify the driver's state of attentiveness. The computing unit is arranged to assign a value to each class. When determining several aspects of the driver's attentiveness, the computing unit may be arranged to assign a separate value to each of the aspects. An additional aspect provides for a table to be stored in the computing unit or in a memory of the computing unit, in which a response time is assigned to the one or more values. Using table look-up the response time can be determined on the basis of the values. The expert term for such a table is in fact "lookup-table." According to an additional aspect the computing unit may be interlinked with other vehicle modules. In this way the direction of attention of the driver can be ascertained by means of this interlinking.

A further aspect of the present disclosure relates to a motor vehicle with the above-described means. A motor vehicle equipped in this way can calculate the response time of a driver. According to a further development the motor vehicle may include means for driving automatically. Such means may include sensors for detecting road traffic. The means may further include a computing unit. Furthermore control means may be provided for intervening with steering, the engine and the brake. According to an additional further aspect means for detecting the traffic situation as well as a computing unit may be provided for calculating, on the basis of the traffic situation, whether the driver's attention and his intervention is required. The computing unit may issue a take-over request to the driver. The above-described computing units may be configured separately or may be combined to form one common computing unit. The computing unit may be arranged to adapt the take-over request to match the driver's state of attentiveness in terms of time and quality.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
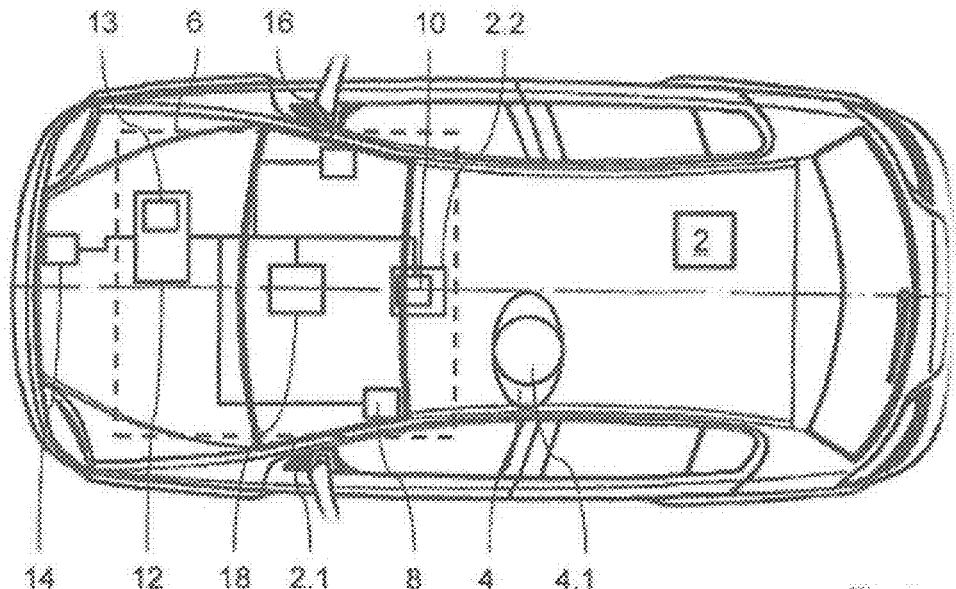
FIG. 1 schematically shows a top view of a motor vehicle.

FIG. 1 shows a schematic top view of a motor vehicle 2. A driver 4 sits in the motor vehicle 2. The motor vehicle 2 is equipped with a device 6 (surrounded by a broken line) which monitors the state of attentiveness of the driver 4. The device 6 includes several components. In the area in front of the driver cameras 8, 10 are arranged, which are directed at a driver's head 4.1. The camera 8 is configured as a stereo camera. The camera 8 is attached to an A-column 2.1, and the camera 10 is attached to a roof bracket 2.2. One of the cameras 8, 10 or both cameras may be arranged to monitor eye movement and/or eyelid movements of the driver 4.

The device 6 further includes a control 12. The control 12 is connected with the cameras 8, 10 and evaluates the camera images accordingly. The driver's state of attentiveness can, as described in detail with reference to FIG. 2, be thus ascertained and a response time can be calculated. The control 12 includes a memory 13 in which a computer program is stored for executing the method described herein.

The motor vehicle 2 further includes sensors 14 which monitor the current traffic. Using the sensors 14 the motor vehicle 2 can drive autonomously. The sensors 14 are coupled to the control 12. In alternative developments the sensors 14 can be coupled to a separate control which in turn is coupled to the control 12. As soon as a traffic situation is ascertained via the sensors 14, which requires the driver's 4 attention, the response time needed to draw the driver's attention to the traffic situation can be calculated.

The control 12 may signal a take-over request to the driver 4. To this end the control 12 may be coupled to a loudspeaker 16. The loudspeaker 16 may use an acoustic signal for signaling the take-over request. The take-over request may be adapted to suit the traffic situation and the state of attentiveness of driver 4.

The control 12 is further coupled to a navigation system 18. Due to this coupling with the navigation system 18 it is possible to ascertain, whether the driver 4, at the time of monitoring, is operating the navigation system 18. This allows conclusions to be drawn as to how long it will take to regain the attention of the driver 4 for the traffic on the road. A coupling with other systems of the motor vehicle 2 is also feasible.

Figure 2:
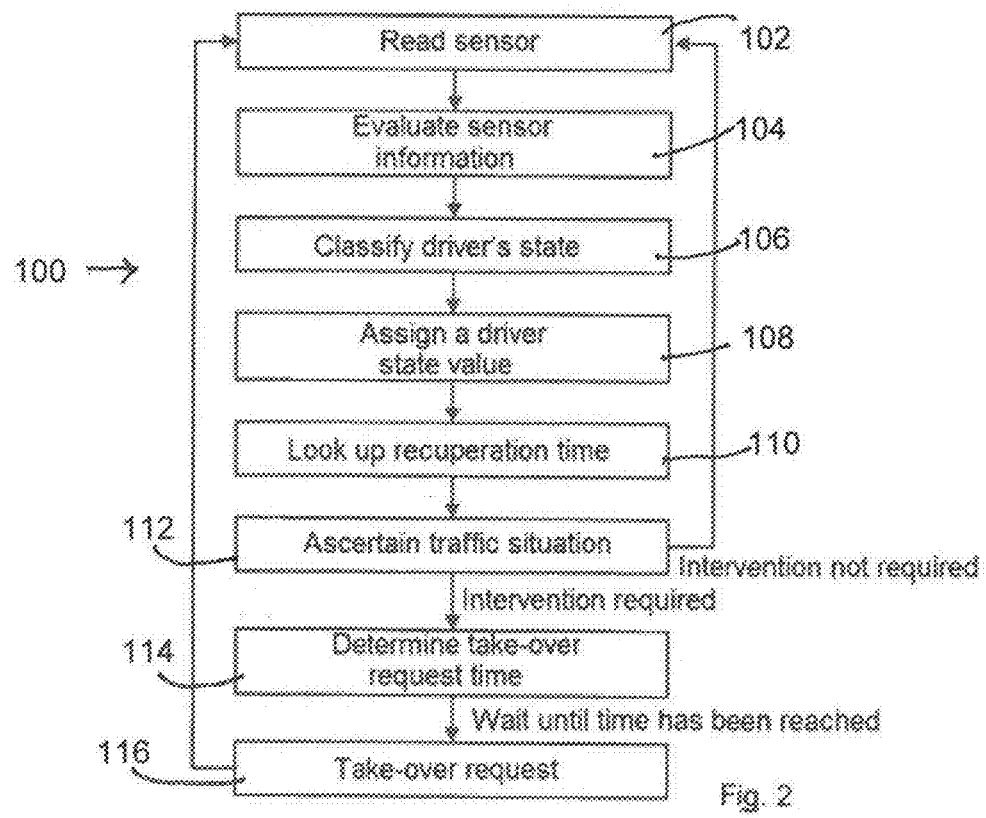
FIG. 2 shows a flow diagram of the method.

With reference now to FIG. 2, a flow diagram of the method according to the present disclosure is shown. In a first step 102, information from the cameras 8, 10 or other sensors is read. In a second step 104, the information read via the sensors 8, 10 is evaluated. In a third step 106, the evaluated information is classified. Classification may, for example, involve assessing the state of tiredness and direction of attention as well as gestures of the driver 4. Each class may have a value assigned to it. In a fourth step 108, a common value is ascertained from the values. To this end the previous steps may be weighted or organized according to other principles.

In a fifth step 110, a response time is ascertained using the common value and a table. The response time is held in readiness. In a sixth step 112, a traffic situation is ascertained. If the traffic situation does not require intervention by the driver 4, the process starts again. Should an intervention by the driver be necessary, then in a seventh step 114, a suitable point in time and a suitable quality of a take-over request is determined using the response time and the state of attentiveness of the driver 4. In an eighth step 116, a corresponding take-over request is issued at a given point in time. Then the process can begin again.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for calculating a response time required to direct the attention of a driver of a vehicle at a situation on the road, the vehicle including at least one computing unit, the method comprising:
    monitoring the driver with at least one sensor to determine at least one driver characteristic data;
    communicating the at least one driver characteristic data from the at least one sensor to the computing unit;
    ascertaining within the computing unit a state of attentiveness of the driver based on the at least one driver characteristic data;
    calculating within the computing unit at least one value based on the state of attentiveness; and
    assigning a response time to the driver based on the at least one valve.

2. The method according to claim 1, wherein monitoring of the driver is carried out at a regular interval.

3. The method according to claim 1, wherein monitoring of the driver is continuously carried out over at an interval.

4. The method according to claim 1, wherein the driver characteristic is selected from the group consisting of a tiredness state, a direction of attention and a gesture state.

5. The method according to claim 4, wherein the driver characteristic comprises the tiredness state determined from one or more of the following: the driver's eyes, the position of the driver's head and the angle of the driver's head.

6. The method according to claim 1, wherein the driver characteristic comprises the gesture state determined by from an accumulated hand-arm travel of the driver.

7. The method according to claim 1, wherein the state of attentiveness includes a plurality of classifications, each having a value assigned thereto, and wherein several aspects of the state of attentiveness are ascertained and a value is determined for each aspect.

8. The method according to claim 1, wherein a response time is assigned to the one or more values in a table, wherein the response time in the table is determined by way of the value.

9. The method according to claim 1, further comprising accounting for at least one vehicle aspect when assigning the response time.

10. A method for operating a motor vehicle, wherein the method is carried out according to claim 1.

11. The method according to claim 10, wherein the motor vehicle drives in an autonomous manner.

12. The method according to claim 10, further comprising ascertaining a traffic situation, and signaling a take-over request to the driver as result of the method according to claim 1.

13. The method according to claim 12, further comprising adapting the take-over request to match the state of attentiveness of the driver in terms of time and quality.

14. A computer program product with a non-transitory computer-readable storage medium having commands embedded therein which when executed on a computing unit cause
 monitoring of a driver of a vehicle with at least one sensor to determine at least one driver characteristic data;
 communicating the at least one driver characteristic data from the at least one sensor to the computing unit within the vehicle;
 ascertaining within the computing unit a state of attentiveness of the driver based on the at least one driver characteristic data;
 calculating within the computing unit at least one value based on the state of attentiveness; and
 assigning a response time to the driver based on the at least one value.

15. A motor vehicle comprising a sensor array monitoring the attentiveness of a driver of the vehicle, wherein the motor vehicle, and a storage medium operably coupled with a computer program product executable on a computing unit within the vehicle to cause,
 monitoring of the driver of the vehicle with the sensor array to determine at least one driver characteristic data;
 communicating the at least one driver characteristic data from the sensor array to the computing unit;
 ascertaining within the computing unit a state of attentiveness of the driver based on the at least one driver characteristic data;
 calculating within the computing unit at least one value based on the state of attentiveness; and
 assigning a response time to the driver based on the at least one value.

16. The motor vehicle according to claim 15, wherein the sensor array includes at least one sensor selected from the group consisting of a camera, a stereo camera, an ultrasound sensor, an infrared sensor or a combination thereof.

* * * * *